United States Patent
Abuelsaad et al.

(10) Patent No.: US 10,592,870 B2
(45) Date of Patent: Mar. 17, 2020

(54) SYSTEM AND METHOD TO ANALYZE AND DETECT ANOMALIES IN VEHICLE SERVICE PROCEDURES

(71) Applicant: International Business Machines Corporation, Armonk, NY (US)

(72) Inventors: Tamer E. Abuelsaad, Somers, NY (US); Gregory J. Boss, Saginaw, MI (US); John E. Moore, Jr., Brownsburg, IN (US); Randy A. Rendahl, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 542 days.

(21) Appl. No.: 15/200,245

(22) Filed: Jul. 1, 2016

(65) Prior Publication Data
US 2018/0005199 A1    Jan. 4, 2018

(51) Int. Cl.
*G06Q 10/00* (2012.01)
*G07C 5/08* (2006.01)
*G06Q 30/00* (2012.01)
*G06F 16/2458* (2019.01)

(52) U.S. Cl.
CPC ......... *G06Q 10/20* (2013.01); *G06F 16/2477* (2019.01); *G06Q 30/018* (2013.01); *G07C 5/0841* (2013.01)

(58) Field of Classification Search
CPC .................................................. G06Q 10/20
See application file for complete search history.

(56) References Cited

U.S. PATENT DOCUMENTS

| 7,420,467 | B2 | 9/2008 | Patenaude et al. |
| 8,095,265 | B2 | 1/2012 | Boss et al. |
| 8,543,283 | B2 | 9/2013 | Boss et al. |
| 2002/0016655 | A1 | 2/2002 | Joao |

(Continued)

FOREIGN PATENT DOCUMENTS

JP    2003132261 A1    5/2003

OTHER PUBLICATIONS

Mell, P. et al., "The NIST Definition of Cloud Computing", NIST Special Publication 800-145, National Institute of Standards and Technology, U.S. Department of Commerce, Sep. 2011, pp. 1-7.

*Primary Examiner* — Dennis W Ruhl
(74) *Attorney, Agent, or Firm* — Scully, Scott, Murphy & Presser, PC; Samuel Waldbaum, Esq.

(57) ABSTRACT

A method and system for analyzing captured vehicle parts alteration data and correlating with vehicle service procedures to identify service completion and anomalies is disclosed. The method and system includes loading captured vehicle parts alteration data for a particular vehicle from a vehicle history module, the vehicle parts alteration data being captured by one or more sensors and stored in the vehicle history module, identifying predefined service procedure events and corresponding procedural steps for the particular vehicle, analyzing the captured vehicle parts alteration data for one or more events that match the predefined service procedure events; and for each service procedure event matched, automatically identifying anomalies by one or more of: identify procedural steps that have been completed and procedural steps that have not been completed and identifying procedural steps that were done that are not in one of the predefined service procedure events.

18 Claims, 2 Drawing Sheets

(56) References Cited

U.S. PATENT DOCUMENTS

| | | |
|---|---|---|
| 2006/0031041 A1* | 2/2006 | Afshar .................. G06Q 10/06 |
| | | 702/184 |
| 2008/0103806 A1 | 5/2008 | Harris |
| 2008/0281658 A1 | 11/2008 | Siessman |
| 2008/0284571 A1 | 11/2008 | Wilbrink et al. |
| 2008/0284575 A1 | 11/2008 | Breed |
| 2009/0303326 A1* | 12/2009 | DeCosmo ................ H04N 7/18 |
| | | 348/148 |
| 2011/0137711 A1 | 6/2011 | Singh et al. |
| 2013/0124032 A1 | 5/2013 | Singh et al. |
| 2013/0158777 A1 | 6/2013 | Brauer et al. |
| 2015/0046582 A1 | 2/2015 | Gelvin et al. |
| 2015/0286994 A1 | 10/2015 | Elder |

* cited by examiner

SYSTEM AND METHOD TO ANALYZE AND DETECT ANOMALIES IN VEHICLE SERVICE PROCEDURES

BACKGROUND OF THE INVENTION

This disclosure is directed to a method and system for analyzing captured vehicle parts alteration data and correlating with vehicle service procedures to identify service completion and anomalies.

Traditionally, the value of a used vehicle is very difficult to ascertain due to the wide variety of factors that can affect it in terms of wear and tear, maintenance, accidents and more. This information is either obtained by human examination of the vehicle or relying on insurance claims.

Clear and complete vehicle histories are very difficult to determine and verify due to the indirect nature by which they can be discovered. The methods available depend on self-reporting and third party discovery related to billing information, accident reports, etc. The current methods do not provide a means by which the vehicle itself is able to provide enough information to describe the vehicle's history to highlight both the positive and negative aspects for the owner, prospective buyers and interested parties such as mechanics.

One very well known solution is the use of a service such as Car Fax®. In this model, a variety of sources external to the car provide information about the vehicle's history. This solution cannot fill the gap of information it was not privy to such as maintenance information, conditions under which the car operated, events that did not result in reporting, etc. The traditional solution is for the vehicle owner to track and collect all receipts and maintenance records. The owner may simply remove from the documentation anything related to negative items (such as collision repair) as well as fabricating records. More importantly, many people simply do not keep the records and are then at a disadvantage during the sale if the vehicle was well maintained.

One known method involves placing RFID tags on personal or vehicle assets attached to the car and then monitoring them. If an asset is missing and it is not expected to be missing then a notification is sent to a user. The actions the system takes in response to a removed item is limited to sending a notification to the owner of the car.

Another known system tracks when car parts have been removed and what types of parts are returned to the vehicle to replace the missing part. The system records what parts or fluids were detected and also records other errors encountered in a log. The system allows the RFID tag of a replaced item to be looked up in a database and cross referenced with the vehicle owner's bill to determine if he was overcharged for parts that shouldn't have cost as much as they are shown on the bill.

Another prior art system detects when service was performed on a vehicle. The system detects the pairing of assets that have been removed and then recording that as a service action is performed. For example the system can understand that an oil change event isn't complete unless both the gasket and oil filter are both replaced.

SUMMARY OF THE INVENTION

In one embodiment, a method for analyzing captured vehicle parts alteration data and correlating with vehicle service procedures to identify service completion and anomalies is disclosed. The method includes loading captured vehicle parts alteration data for a particular vehicle from a vehicle history module, the vehicle parts alteration data being captured by one or more sensors and stored in the vehicle history module, identifying predefined service procedure events and corresponding procedural steps for the particular vehicle, analyzing the captured vehicle parts alteration data for one or more events that match the predefined service procedure events; and for each service procedure event matched, automatically identifying anomalies by one or more of: determining whether or not all procedural steps have been completed and determining whether one or more procedural steps were done that are not in one of the predefined service procedure events. The step of automatically identifying anomalies may also include one or more of determining whether the procedure event was done at an authorized repair shop, whether the procedure event was done at recommended mileage and whether the procedure steps were performed in the proper sequence.

In another embodiment, a system is disclosed having at least one data processor connected to at least one memory that stores software instructions, where execution of the software instructions by the at least one data processor causes the system to analyze captured vehicle parts alteration data and correlate with vehicle service procedures to identify service completion and anomalies. The system causes the computer to load captured vehicle parts alteration data for a particular vehicle from a vehicle history module, the vehicle parts alteration data being captured by one or more sensors and stored in the vehicle history module, identify predefined service procedure events and corresponding procedural steps for the particular vehicle, analyze the captured vehicle parts alteration data for one or more events that match the predefined service procedure events; and for each service procedure event matched, automatically identify anomalies by one or more of: determining whether or not all procedural steps have been completed and determining whether one or more procedural steps were done that are not in one of the predefined service procedure events. The system may also automatically identify anomalies by one or more of determining whether the procedure event was done at an authorized repair shop, whether the procedure event was done at recommended mileage and whether the procedure steps were performed in the proper sequence.

In a further embodiment, a computer program product is disclosed having software instructions on a non-transitory computer-readable medium, where execution of the software instructions using a computer causes the computer to analyze captured vehicle parts alteration data and correlate with vehicle service procedures to identify service completion and anomalies. The computer program product causes the computer to load captured vehicle parts alteration data for a particular vehicle from a vehicle history module, the vehicle parts alteration data being captured by one or more sensors and stored in the vehicle history module, identify predefined service procedure events and corresponding procedural steps for the particular vehicle, analyze the captured vehicle parts alteration data for one or more events that match the predefined service procedure events; and for each service procedure event matched, automatically identify anomalies by one or more of: identify procedural steps that have been completed and procedural steps that have not been completed and identify procedural steps that were done that are not in one of the predefined service procedure events.

DETAILED DESCRIPTION OF PREFERRED EMBODIMENTS

Figure 1:
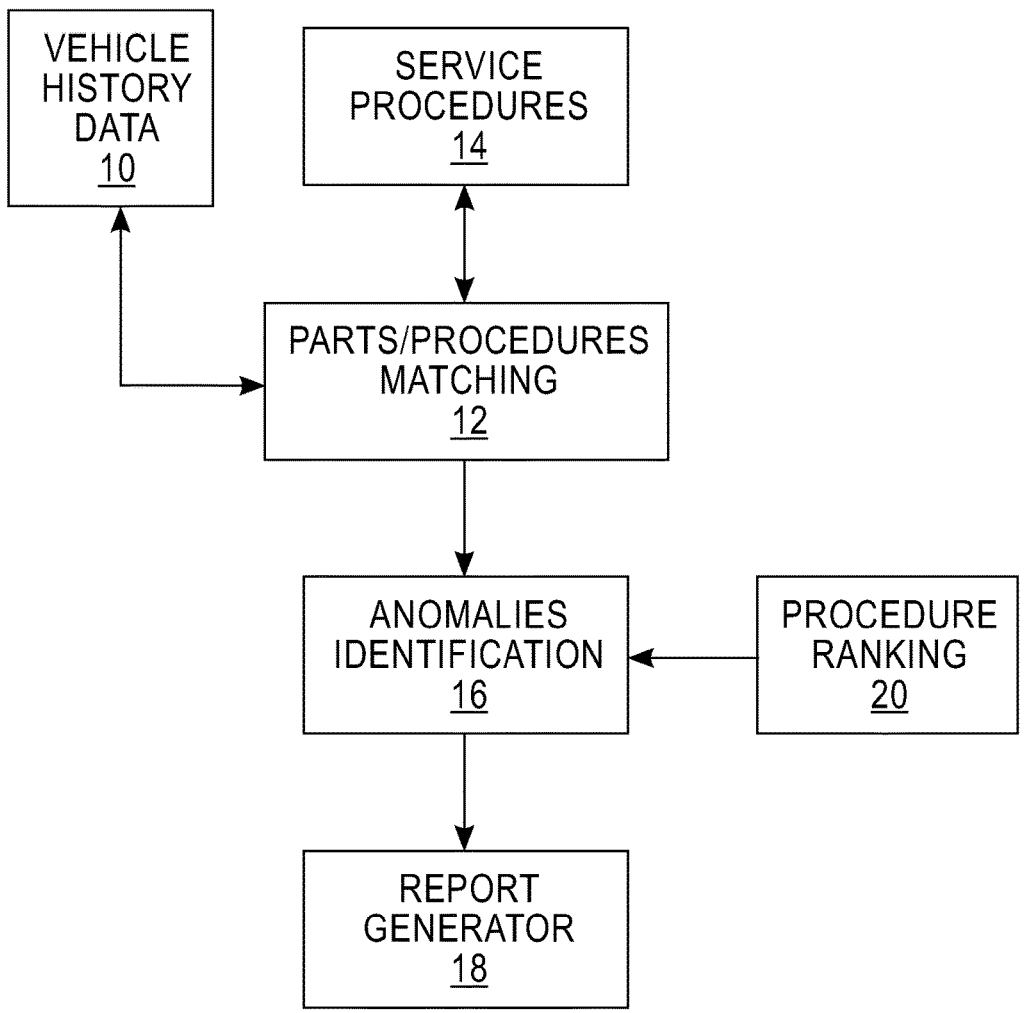
FIG. 1 is a block diagram of one embodiment of the invention disclosed in this specification.

A vehicle consists of multiple parts or assets of varying sizes. This disclosure is directed to a system and method to analyze the data that is collected to determine what mechanical and repair procedures have occurred, if they occurred at the correct location, in the correct order and for the correct duration. The collection of data is based on built in sensors that provide immutable data at a very granular level. The system and method identifies and analyzes the details of the repair procedures to access the quality and very existence of the repair. The tracking is not dependent on a central system or participation in a single service providing a more portable capability.

In one embodiment, a method and system are disclosed that employs logic for determining if an asset of a vehicle that has been removed, that it has been removed in the proper order as well as detection of attributes of the removal and environmental conditions that would indicate if that asset was being serviced, replaced, repaired, stolen or disassembled. The method and system may also detect if a series of events constitute an accepted or best practice for a vehicle repair which involves multiple steps. In one embodiment, the method and system analyzes a variety of metrics from sensors that capture the vehicle's history as it occurs and provides insights about the vehicle's history. Analysis of this history can yield anomalous behaviors in vehicle repairs as well as proper and successful completion of necessary maintenance.

A system of various onboard sensors and other instrumentation are employed for recording the changes within the vehicle part set to achieve intelligence from this data and provide controlled meaningful analysis to vehicle buyer, vehicle owner, and others. Based on historic information of vehicle events captured by the sensors and instrumentation, events are reviewed, including their sequence of occurrence, location and duration to assess the history and provide insights into positive/negative events affecting the vehicle's current and future reliability.

In one embodiment, the vehicle history along with a pattern of data analysis can identify events that are relevant to the overall quality of the vehicle. Additionally, the disclosure provides the interpretation of the data collected to identify key events in the vehicle's history that indicate concerns or support the argument that that the vehicle is well maintained.

In one embodiment, the method and system analyzes captured vehicle parts alteration data and correlates the data with mechanical repair procedures to identify repair completion and anomalies. In one embodiment, the method and system uses analysis of the order of operations within a repair operation. In another embodiment, the method and system provides for the identification of characteristics that indicate areas of concern such as extended time frames, incident locations outside the context of licensed repair facilities, repair operations outside the normal range, based on, for example mileage or age, and whether they are high or low. In another embodiment, the method and system includes opening the event history to an external application or plug-in to perform independent analysis.

Matching vehicle history to repair procedures is done for, but not limited to, the following reasons:

Identify if a service person followed the proper repair procedure steps.

Identify if a service person completed the repair procedure.

Identify if a vehicle received all of its recommended major necessary service procedures (e.g. oil changes, fluid draining, tire rotation, timing belt/chain replacement).

Identify if a vehicle repair was done in a proper or authorized repair location.

Identify if a necessary service procedure was completed at the recommended mileage (e.g. replacing oil every 3k miles, etc.)

Identify to a buyer necessary service repairs that have not been conducted by a previous owner.

In one embodiment, as shown in FIG. 1, data from a vehicle history module 10 is loaded into a matching module 12. The loaded data is captured vehicle parts alteration data for a particular vehicle for the life of the vehicle or a selected period of time. The vehicle parts alteration data is captured by one or more sensors and stored in the vehicle history module 10.

For the particular vehicle, service procedure events and their steps are identified from a service procedures module 14 and loaded into the matching module 12. Some service procedures may have a strict set of ordered steps while others may not.

The parts alteration/procedure events matching module 12 analyzes the captured vehicle parts alteration data and correlates the data with the identified service procedures to identify repair completion and anomalies.

In one embodiment, the vehicle history data is examined for sequenced events or event patterns that match a defined set of service procedural events. Some events must occur in a specific order to match a service procedural event, others do not. For each service procedure matched, the anomalies identification module 16 automatically identifies steps that have been completed and other steps that have not been completed by comparing captured vehicle events to a given service procedure. The anomalies identification module 16 also automatically identifies steps that were done, but not in a known service procedure. Report module 18 generates a report for this vehicle highlighting the identified anomalies.

In one embodiment, a procedure ranking module 20 provides a set of inputs to the anomalies identification module 16 that are related to which vehicle parts are considered more important than others as well as which service procedures are more important than others. This data is merged with anomalies data to provide a report to rate the impact on vehicle ongoing health. For example, oil filter not being replaced has significant impact on the life of the engine.

In one embodiment, the report includes vehicular meta data, such as location of service, mileage, length of service and any other data captured by the sensors. In another embodiment, a service procedure is checked if there is a recommended service mileage and if so, it is compared to the current mileage. If the difference is within a threshold, then the event is not flagged as an anomaly. If the difference is outside the threshold, the event is flagged in the report as an anomaly.

In one embodiment, the report can include additional information such as the location of service. If the location is a certified location for the particular vehicle, then this can be highlighted in the report.

Another embodiment includes a method to open the event history to an external application or plug-in to perform independent analysis. In one embodiment, the user can procure one of many vehicle history events analysis and insight applications, the vehicle owner (or an authorized entity) grants access of vehicle history events to a procured application, the procured application examines historical events and the procured application provides insight to the user. An example, is at the time of purchasing a used vehicle, the potential new owner can request such service. The procured application provides insight about the service location, such as whether anomalies in repair occurred at authorized service locations or average repair shops.

The invention also applies to other industry sectors, and has other uses in the IOT arena, including manufacturing, aircraft, etc. For example, in aircraft maintenance, many items must follow a very prescript set order of completing a task.

In another embodiment, the method and system disclosed herein is used for training and verification through dynamic feedback. This can be done by having the item being worked on validate and verify that the steps being seen by the IOT sensors are done correctly and if not, alert the user/worker to the fact that they skipped a step. Done by the analytics engine that verifies the steps were taken and in the right order.

Figure 2:
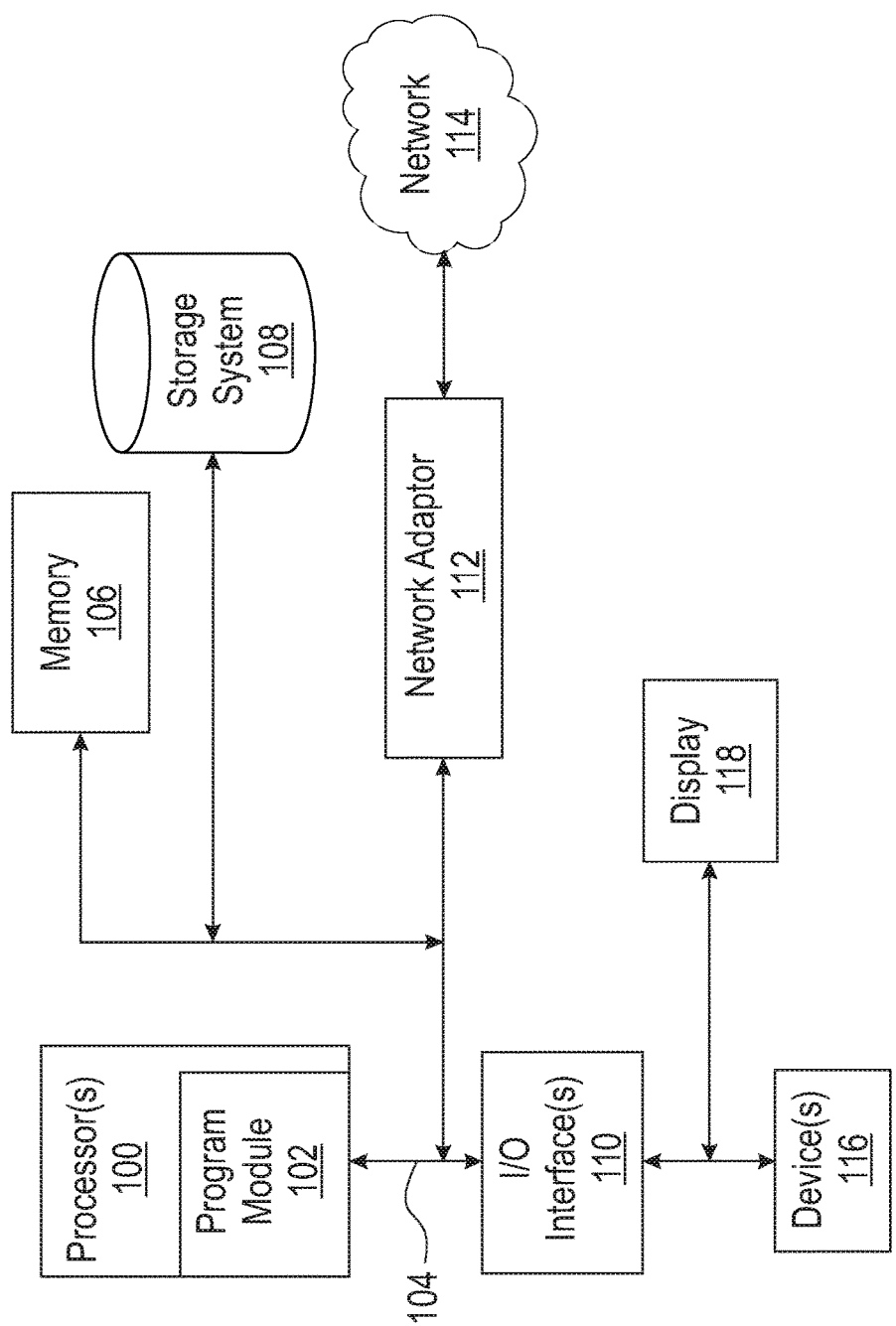
FIG. 2 is a block diagram of an exemplary computing system suitable for implementation of the embodiments of the invention disclosed in this specification.

FIG. 2 illustrates a schematic of an example computer or processing system that may implement the method for analyzing captured vehicle parts alteration data and correlating with vehicle service procedures to identify service completion and anomalies in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 2 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 100, a system memory 106, and a bus 104 that couples various system components including system memory 106 to processor 100. The processor 100 may include a program module 102 that performs the methods described herein. The module 102 may be programmed into the integrated circuits of the processor 100, or loaded from memory 106, storage device 108, or network 114 or combinations thereof.

Bus 104 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 106 can include computer system readable media in the form of volatile memory, such as random access memory (RAM) and/or cache memory or others. Computer system may further include other removable/non-removable, volatile/non-volatile computer system storage media. By way of example only, storage system 108 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 104 by one or more data media interfaces.

Computer system may also communicate with one or more external devices 116 such as a keyboard, a pointing device, a display 118, etc.; one or more devices that enable a user to interact with computer system; and/or any devices (e.g., network card, modem, etc.) that enable computer system to communicate with one or more other computing devices. Such communication can occur via Input/Output (I/O) interfaces 110.

Still yet, computer system can communicate with one or more networks 114 such as a local area network (LAN), a general wide area network (WAN), and/or a public network (e.g., the Internet) via network adapter 112. As depicted, network adapter 112 communicates with the other components of computer system via bus 104. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a non-transitory computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

In addition, while preferred embodiments of the present invention have been described using specific terms, such description is for illustrative purposes only, and it is to be understood that changes and variations may be made without departing from the spirit or scope of the following claims.

What is claimed is:

1. A computer implemented method for analyzing vehicle sensor data and identifying anomalies in service procedures, comprising:
    capturing vehicle parts alteration data for a vehicle, the vehicle parts alteration data being a plurality of metrics captured by a plurality of sensors;
    automatically interpreting the captured vehicle parts alteration sensor data metrics to determine whether a service procedure event that matches a predefined service procedure has been performed, the predefined service procedures comprising a sequence of steps to be performed;
    in a case when a matched service procedure event is found, automatically analyzing the captured vehicle parts alteration sensor data metrics to identify performed procedural steps corresponding to the matched service procedure event;
    automatically determining, based on the captured vehicle parts alteration sensor data metrics:
        whether the performed procedural steps do not include all of the predefined service procedures;
        whether the performed procedural steps were not performed in an order defined in the sequence of steps of the predefined service procedures;
        whether one or more of the performed procedural steps are not one of the sequence of steps of the predefined service procedures; and
            whether the performed procedural steps were not performed at a service location identified by the predefined service procedures;
    automatically identifying an anomaly in the performed procedural steps when one or more of:
        a determination is made that the performed procedural steps do not include all of the predefined service procedures;
        a determination is made that the performed procedural steps were not performed in an order defined in the sequence of steps of the predefined service procedures;
        a determination is made that one or more of the performed procedural steps are not one of the sequence of steps of the predefined service procedures; and
        a determination is made that the performed procedural steps were not performed at a service location identified by the predefined service procedures; and
    automatically providing a dynamic feedback notification when an anomaly has been identified.

2. The method of claim 1, wherein the captured vehicle parts alteration data metrics for the vehicle is for one of the life of the vehicle and a selected period of time.

3. The method of claim 1, further including generating a report based on the matched the predefined service procedure events, the report including the identified anomalies and vehicle meta data, the vehicle meta data including at least one or more of location of service, mileage and length of service.

4. The method of claim 1, further including providing access to an external application or plug-in to perform independent analysis by the external application or plug in, of the captured vehicle parts alteration sensor data metrics to identify the anomaly.

5. The method of claim 1, wherein automatically identifying anomalies further includes determining that the performed procedural steps were not performed within a vehicle mileage range identified by the predefined service procedures.

6. The method of claim 1, wherein the captured vehicle parts alteration data metrics includes attributes of parts removal and environmental conditions.

7. A system comprising:
    at least one data processor connected to at least one memory that stores software instructions, where execution of the software instructions by the at least one data processor causes the system to analyze vehicle sensor data and identify anomalies in service procedures, by:
    capturing vehicle parts alteration data for a vehicle, the vehicle parts alteration data being a plurality of metrics captured by a plurality of sensors;
    automatically interpreting the captured vehicle parts alteration sensor data metrics to determine whether a service procedure event that matches a predefined service procedure has been performed, the predefined service procedures comprising a sequence of steps to be performed;
    in a case when a matched service procedure event is found, automatically analyzing the captured vehicle parts alteration sensor data metrics to identify performed procedural steps corresponding to the matched service procedure event;
    automatically determining, based on the captured vehicle parts alteration sensor data:
        whether the performed procedural steps do not include all of the predefined service procedures;
        whether the performed procedural steps were not performed in an order defined in the sequence of steps of the predefined service procedures
        whether one or more of the performed procedural steps are not one of the sequence of steps of the predefined service procedures;
        whether the performed procedural steps were not performed at a service location identified by the predefined service procedures;
    automatically identifying an anomaly in the performed procedural steps when one or more of:
        a determination is made that the performed procedural steps do not include all of the predefined service procedures;
        a determination is made that the performed procedural steps were not performed in an order defined in the sequence of steps of the predefined service procedures;
        a determination is made that one or more of the performed procedural steps are not one of the sequence of steps of the predefined service procedures; and
        a determination is made that the performed procedural steps were not performed at a service location identified by the predefined service procedures; and
    automatically providing a dynamic feedback notification when an anomaly has been identified.

8. The system of claim 7, wherein the captured vehicle parts alteration data metrics for the vehicle is for one of the life of the vehicle and a selected period of time.

9. The system of claim 7, wherein execution of the software instructions by the at least one data processor further causes the system to generate a report based on the matched the predefined service procedure events, the report including the identified anomalies and vehicle meta data, the vehicle meta data including at least one or more of location of service, mileage and length of service.

10. The system of claim 7, wherein execution of the software instructions by the at least one data processor further causes the system to provide access to an external application or plug-in to perform independent analysis by the external application or plug in of the captured vehicle parts alteration sensor data metrics to identify the anomaly.

11. The system of claim 7, wherein automatically identifying anomalies further includes determining that the performed procedural steps were not performed within a vehicle mileage range identified by the predefined service procedures.

12. The system of claim 7, wherein the captured vehicle parts alteration data metrics includes attributes of parts removal and environmental conditions.

13. A computer program product comprising:
software instructions on a non-transitory computer-readable medium, where execution of the software instructions using a computer causes the computer to analyze vehicle sensor data and identifying anomalies in service procedures, by:
capturing vehicle parts alteration data for a vehicle, the vehicle parts alteration data being a plurality of metrics captured by a plurality of sensors;
automatically interpreting the captured vehicle parts alteration sensor data metrics to determine whether a service procedure event that matches a predefined service procedure has been performed, the predefined service procedures comprising a sequence of steps to be performed;
in a case when a matched service procedure event is found, automatically analyzing the captured vehicle parts alteration sensor data metrics to identify performed procedural steps corresponding to the matched service procedure event;
automatically determining, based on the captured vehicle parts alteration sensor data metrics:
whether the performed procedural steps do not include all of the predefined service procedures;
whether the performed procedural steps were not performed in an order defined in the sequence of steps of the predefined service;
whether one or more of the performed procedural steps are not one of the sequence of steps of the predefined service procedures; and
whether the performed procedural steps were not performed at a service location identified by the predefined service procedures;
automatically identifying an anomaly in the performed procedural steps when one or more of:
a determination is made that the performed procedural steps do not include all of the predefined service procedures;
a determination is made that the performed procedural steps were not performed in an order defined in the sequence of steps of the predefined service procedures;
a determination is made that one or more of the performed procedural steps are not one of the sequence of steps of the predefined service procedures; and
a determination is made that the performed procedural steps were not performed at a service location identified by the predefined service procedures; and
automatically providing a dynamic feedback notification when an anomaly has been identified.

14. The computer program product of claim 13, wherein the captured vehicle parts alteration data metrics for the vehicle is for one of the life of the vehicle and a selected period of time.

15. The computer program product of claim 13, wherein execution of the software instructions using a computer further causes the computer to generate a report based on the matched the predefined service procedure events, the report including the identified anomalies and vehicle meta data, the vehicle meta data including at least one or more of location of service, mileage and length of service.

16. The computer program product of claim 13, wherein execution of the software instructions using a computer further causes the computer to provide access to an external application or plug-in to perform independent analysis by the external application or plug in of the captured vehicle parts alteration sensor data metrics to identify the anomaly.

17. The computer program product of claim 13, wherein automatically identifying anomalies further includes determining that the performed procedural steps were not performed within a vehicle mileage range identified by the predefined service procedures.

18. The computer program product of claim 13, wherein the captured vehicle parts alteration data metrics includes attributes of parts removal and environmental conditions.

* * * * *